United States Patent
Seligmann et al.

(10) Patent No.: US 9,369,587 B2
(45) Date of Patent: Jun. 14, 2016

(54) SYSTEM AND METHOD FOR SOFTWARE TURRET PHONE CAPABILITIES

(71) Applicant: Avaya Inc., Basking Ridge, NJ (US)

(72) Inventors: Doree Duncan Seligmann, New York, NY (US); Linda Schumacher, Basking Ridge, NJ (US)

(73) Assignee: Avaya Inc., Basking Ridge, NJ (US)

( * ) Notice: Subject to any disclaimer, the term of this patent is extended or adjusted under 35 U.S.C. 154(b) by 375 days.

(21) Appl. No.: 13/780,899

(22) Filed: Feb. 28, 2013

(65) Prior Publication Data

US 2014/0241340 A1    Aug. 28, 2014

(51) Int. Cl.
*H04L 12/66* (2006.01)
*H04M 9/00* (2006.01)

(52) U.S. Cl.
CPC ................................. *H04M 9/003* (2013.01)

(58) Field of Classification Search
None
See application file for complete search history.

(56) References Cited

U.S. PATENT DOCUMENTS

| | | | |
|---|---|---|---|
| 2008/0212490 A1* | 9/2008 | Greve et al. | 370/254 |
| 2008/0275951 A1* | 11/2008 | Hind et al. | 709/204 |
| 2010/0097650 A1* | 4/2010 | Seo | 358/1.15 |
| 2010/0098055 A1* | 4/2010 | Kutt et al. | 370/352 |
| 2012/0182381 A1* | 7/2012 | Abate et al. | 348/14.03 |

OTHER PUBLICATIONS

"Orange Trading Solutions Mach 3D turret". Corporate Website. Nov. 23, 2010, http://www.orange-business.com/en/mnc2/themes/trading-solutions/our-solutions/etrali-mach-3D-acf/. Retrieved Nov. 23, 2010.
"Speakerbus iturret dealerboard". Speakerbus SIP dealerboard Website, Apr. 1, 2011, http://www.speakerbus.com/uk/index.php/products/detail/i_turret_id808/. Retrieved Apr. 10, 2011.
"Speakerbus". Corporate Website. Apr. 1, 2011, http://www.speakerbus.com/uk/index.php/products/detail/i_turret_id808/. Retrieved Apr. 1, 2011.
"IP Trade". IP Trade Corporate website. May 30, 2012, http://www.iptrade-networks.com/. Retrieved May 30, 2012.

* cited by examiner

*Primary Examiner* — Minh-Trang Nguyen
(74) *Attorney, Agent, or Firm* — Sheridan Ross P.C.

(57) ABSTRACT

Disclosed herein are systems, methods, and non-transitory computer-readable storage media for software turret phone functionalities. A system can display, via a graphical user interface, graphical elements grouped according to a common attribute. Each of the graphical elements can represent an open communication line connecting a first device associated with a first user with a second respective device associated with a second respective user. The system can receive a selection of a graphical element of the graphical elements from the first user, the selection indicating a selected user associated with a respective device. Based on the selection, the system can manipulate a corresponding open communication line connecting the first device associated with the first user with the respective device associated with the selected user.

22 Claims, 5 Drawing Sheets

SYSTEM AND METHOD FOR SOFTWARE TURRET PHONE CAPABILITIES

BACKGROUND

1. Technical Field

The present disclosure relates to turret phones and more specifically to software turret phone capabilities.

2. Introduction

Turret phones are specialized phones designed for financial traders. A turret phone enables a user to control multiple dedicated, always-on lines of communication that can be used simultaneously. Turret phones, such as trading turrets, are frequently used by stock traders to simultaneously communicate with multiple parties. Trading turrets have capabilities specifically designed for the needs of financial traders, enabling users to prioritize incoming calls and make calls instantaneously by pushing a single button. Turret phones have dual handsets, multichannel speaker units, and a large grid of communication lines. Among its many uses, a turret phone was designed for a trader to more easily broker sales between buyers and sellers. Typically, the turret phone is equipped with two separate handsets that the broker holds in each hand, by each ear. Thus, the broker communicates with both the buyer and seller simultaneously, and is able to hear both at the same time. The broker uses a button on the handset to control which party she speaks to. Other capabilities, such as "hoot and holler," enable the user to communicate with a large group of people at the same time, similar to a party-line. An important feature of turret systems is a "ringdown" feature for instantaneous virtual open circuits. Another important feature is the large distribution circuits which allow immediate mass dissemination of information to other users.

Soft-turrets are an alternative to traditional physical turret phones. In particular, soft-turrets replicate the functionality of a traditional turret phone using a computer with a display. Graphical user interfaces allow users to interact with computers and other devices, such as smartphones and tablets, using images instead of textual commands. However, currently, soft-turrets have failed to take full advantage of user interface technology and new input capabilities, such as touch and gestures. Indeed, the current soft-turrets are not intuitive or user-friendly, and lack significant benefits and advantages from various features of user interface technology, which can simplify the use of soft-turrets and increase efficiency and productivity of turret users.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for software turret phone capabilities. The system can provide turret phone functionalities via a graphical display, which can include, for example, a virtual three-dimensional environment representing a collection of active and available communication lines and/or called parties. The turret phone functionalities can include one or more communication modes/channels, including audio, video, chat, text, simple messaging service, email, instant messaging, etc. In some embodiments, the graphical display depicts and/or arranges these communication lines as a virtual environment. For example, the graphical display can depict and/or arrange the communication lines as a virtual building having specialized rooms. Each of the specialized rooms can graphically represent an activity status, a buyer, a seller, a communication line, and/or a device in use, among other things.

The system can display, via a graphical user interface, graphical elements grouped according to a common attribute, such as a status, a geographic location, a department, a topic, an organization, a subject, a role, a title, a job, a position, a relationship, a business characteristic, etc. Each of the graphical elements can represent an open communication line that connects a first device associated with a first user with a second device associated with a second user, such as a seller with a buyer. As used herein, a device can refer to a communications device, such as a phone, a computer, a media entertainment system, a conferencing system, a gaming system, a tablet computer, a processing device, an external device, etc., but can also refer to specific input and/or output capabilities in a device, such as a speaker, a headset, a microphone, a camera, a touch screen, a display, smart glasses, a sensor, a joystick, etc. The system can receive a selection of a graphical element from the first user, indicating a selected second user. Control of the open communication line can be manipulated through user gestures, such as a screen swipe or a drag and drop feature; input commands, such as verbal or textual input commands; and/or input devices, such as a mouse, a keyboard, a stylus, a handset, a remote, dial-pad, a touchpad, a joystick, a controller, etc. Based on the selection, the system can manipulate the open communication line connecting the first device with the selected second user.

The first user can hear and/or, speak exclusively to the second user via the open communication line. The first user can also see the second user (and/or an image associated with the second user) and/or communicate exclusively with the second user via the open communication line. The open communication line can be a dedicated line. Moreover, because the users are connected through an open, always-on communication line, the users can simply begin communicating once their devices are connected. Thus, no dialing or ringing/answering may be necessary. Based on preference, a beep-tone can be added the first time a connection is made. The users can manipulate the open communication line by activating the open communication line or deactivating the open communication line, for example. Activating the open communication line can include initiating a communication via the open communication line, and deactivating the open communication line can include terminating a communication via the open communication line. Audio in the communication can be provided via audio spatialization, allowing a user to have a realistic listening experience. The audio spatialization can create the impression that sounds are coming from sound sources placed anywhere in a space, including a two, three, or four-dimensional space, and not just from the location of the speakers.

The system can update the graphical elements on a display based on, for example, activity associated with the open communication line or a status associated with the open communication line, such as busy. The first user can select a set of communication lines, or specialized rooms, such that the first user is heard by participants connected to the set of communication lines and the participants connected to the set of communication lines are heard by the first user. In addition to selecting a set of communication lines, the system can monitor one or more open communication lines, such that the system plays audio from the communication lines on an output device, such as a speaker. The system can analyze the audio from the monitored communication lines for activity, specific words, speaker tone, speech recognition, speaker behavior, noise or activity levels, audio type, audio quality, audio levels, call status, etc., and the system can update the graphical elements based on the audio analysis. For example, the system can display the word "buy" in a particular graphical element, such as a room in the virtual building, when the system detects the word "buy" from the monitored audio, using speech recognition.

Turret phone features can be mapped to a virtual environment, and can be depicted graphically, as well as using audio, text, and/or any other form of media content. Input/output channels in a device can be mapped to audio sources in the virtual environment. Entities and/or objects in the virtual environment can be positioned in the virtual environment according to specific characteristics, preferences, parameters, relationships, inputs, channels, etc. For example, entities can be positioned in the virtual environment to depict a directory of entities. The virtual environment can be navigated by a user, to allow a user to search and/or select entities or objects in the virtual environment; view, analyze, and perceive entities or objects in the virtual environment; and/or manipulate the virtual environment and/or objects, entities, or channels in the virtual environment. Entities, objects, and/or channels in the virtual environment can be monitored and analyzed for specific activity, keywords, state, presence, changes, audio, video, communications, user(s), topics, cues, etc. For example, a "bug" can be placed in an object from the virtual environment to monitor any communication, events, users, and/or activity by that object. Here, the object can represent a user, a channel, an open communication line, an organization, a device, a conversation, an entity, etc.

The turret phone capabilities can be implemented using various interfaces and inputs, such as gestures, speech, commands, graphical displays, voice recognition, controllers, remotes, a mouse, touchscreen, etc. Displays can include a large display, a small display, combinations of screens, a "see through" display, "glasses," a camera, a monitor, etc. Audio can be recorded, received, and outputted using speakers, headsets, microphones, and/or any other audio input/output device. For example, conversations in a channel can be recorded using a microphone for future playback via a speaker. A history of communications can be stored and later provided via animated playback, for example. Moreover, auxiliary objects can also be included in the virtual environment for a richer experience. For example, filters, documents, news feeds, articles, tags, and/or comments can be provided for a user in the virtual environment. The auxiliary objects can be related and/or relevant to specific entities, channels, and or objects in the virtual environment, for example.

The turret phone functionalities provided via a graphical user interface can be beneficial to a user, such as a stock trader, because it can allow the user more functionality and ease-of-use than a traditional turret phone can provide. The graphical user interface can also be intuitive and user-friendly, in order to increase user efficiency and productivity, and facilitate the use of the various turret phone functionalities, for example.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for software turret phone functionalities. A system, method and non-transitory computer-readable media are disclosed which provide turret phone functionalities via a graphical user interface. A brief introductory description of a basic general purpose system or computing device in FIG. 1, which can be employed to practice the concepts, is disclosed herein. A more detailed description of turret phone functionalities will then follow. The disclosure now turns to FIG. 1.

Figure 1:
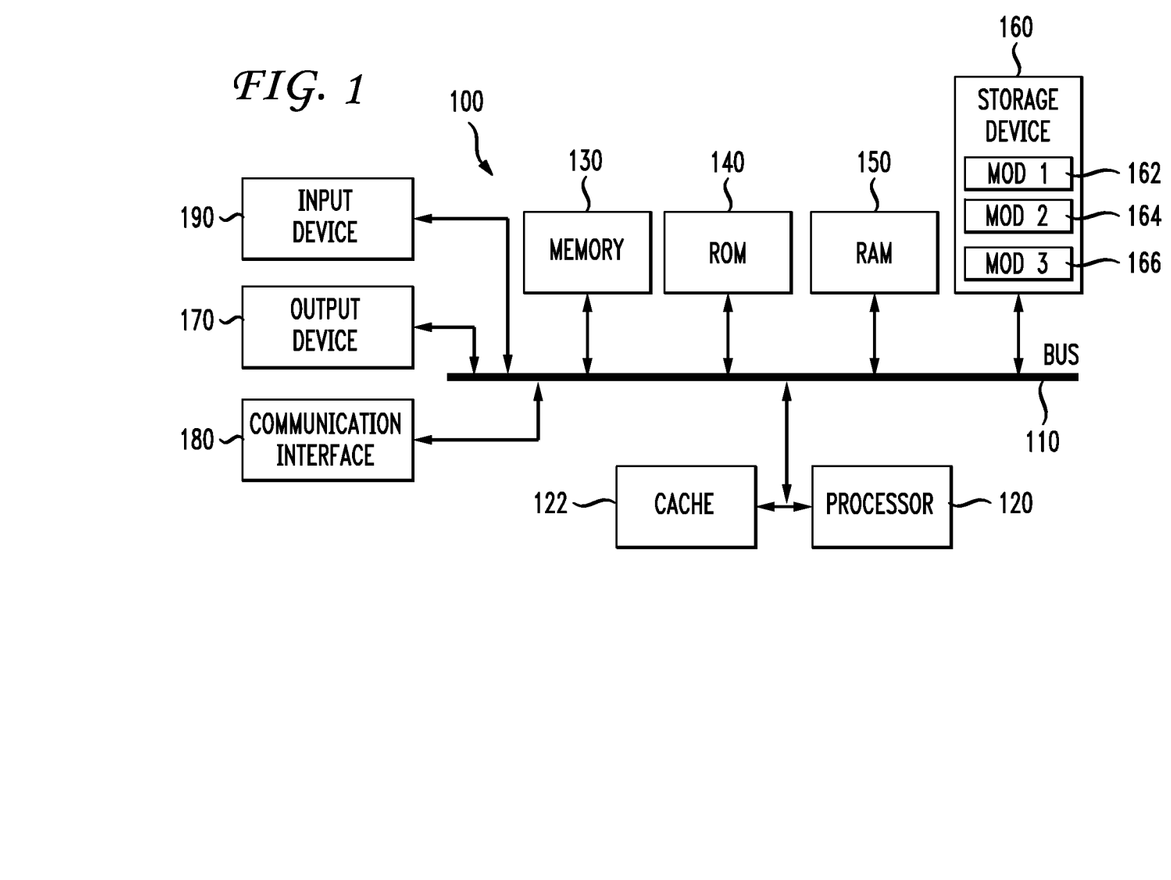
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Computer-readable storage media expressly exclude transitory or intangible media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Figure 2:
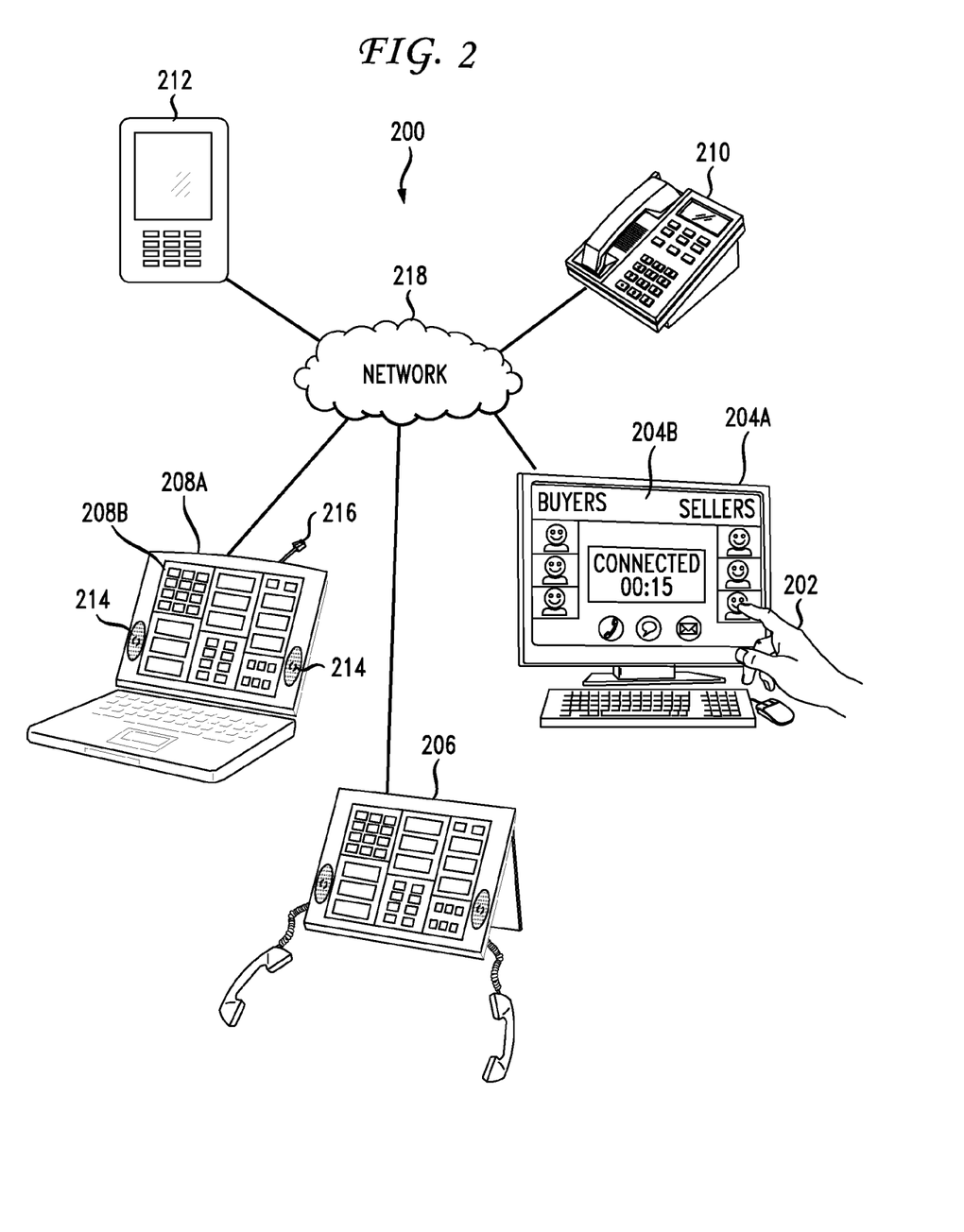
FIG. 2 illustrates an example architecture for a virtual turret phone.

Having disclosed some components of a computing system, the disclosure now turns to FIG. 2, which illustrates an example architecture 200 for a virtual turret phone. The software counterparts to turret phones, soft-turrets 204A and 208A, can mimic the functionalities of the traditional turret phone, allowing for communication via multiple, open and/or dedicated communication lines on any single soft-turret device. Soft-turrets 204A and 208A can also leverage the capabilities of user interfaces, such as gestures and intuitive displays, to implement turret phone capabilities. Traditional turret phones have dual handsets, multichannel speaker units and a large grid of communication lines. Soft-turrets 204A and 208A, on the other hand, can provide the same functionalities without multiple handsets and/or a large, physical grid of communication lines. Moreover, soft-turrets 204A and 208A can allow users the flexibility to connect to the architecture 200 to communicate with other phones, using multiple communication lines from any location, without tying users to a desk at a specific location, such as the trading floor, unlike traditional turret phones.

With soft-turrets 204A and 208A, users are not limited to the traditional turret phone hardware and communication functionalities. Users of traditional turret phones typically group phone lines based on categories, and rely on their memory to know active capabilities and line locations. By contrast, with a soft-turret phones 204A and 208A, users can make calls to traditional turret phones 206, mobile phones 212, traditional telephones 210, and/or other soft-turret phones 204A and 208A, using graphical user interfaces 204B and 208B to display the various turret features, lines, functions, and/or entities, in an intuitive way, which can be adapted to a particular environment, user, organization, entity, requirements, settings, functionality, theme, hardware, software, performance, usability, etc. Extensions to software counterparts can have additional communication lines, alternative input/output devices, such as microphones 216 and speakers 214, and/or additional management and communication capabilities, for example.

In some embodiments, user 202 can manipulate one or more open communication lines using an interface 204B on soft-turret 204A. Through the interface 204B, the user 202 can activate the communication lines, deactivate the communication lines, manage the communication lines, organize the communication lines, and/or interact with the callees, for example. Callees can communicate through the open communication lines with the user 202 on the soft-turret 204A, using one or more types of communication devices, such as a traditional turret phone 206, another soft-turret phone 208A, a mobile phone 212, a traditional PSTN telephone 210, and/or any other type of communication device. Indeed, any mode of communication is contemplated herein. For example, when user 202 and a callee communicate via a device, such as a computer, they can utilize any mode of communication the device allows, such as a phone call, an instant message (IM), an email, a video conference, a chat; and can implement any input device, such as a microphone, speakers, a keyboard, a mouse, a camera, a touch screen, a joystick, a controller, a remote, a mobile device, and/or any other input device.

The phones 204B, 206, 208B, 210, and 212 in the architecture 200 can communicate via network 218. The network 218 can include a public network, such as the Internet, but can also include a private or quasi-private network, such as an intranet, a home network, a virtual private network (VPN), a shared collaboration network between separate entities, etc. Indeed, the principles set forth herein can be applied to many types of networks, such as local area networks (LANs), virtual LANs (VLANs), corporate networks, wide area networks, and virtually any other form of network. The soft-turrets 204A and 208A can include any processing device with a display and/or connected to a display, such as a mobile phone, a laptop, a desktop computer, a tablet computer, a portable media player, a game system, a smart television, a conferencing system, etc.

Figure 3:
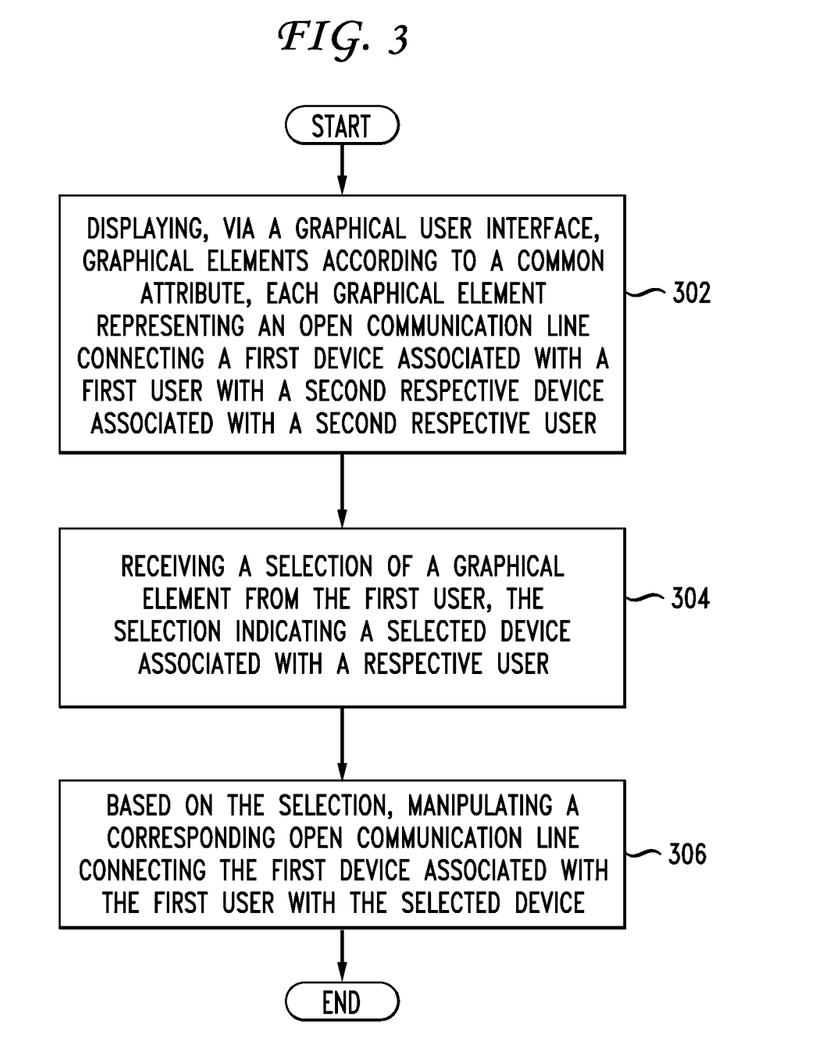
FIG. 3 illustrates an example method embodiment.

Having disclosed some basic system components and concepts, the disclosure now turns to the exemplary method embodiment shown in FIG. 3. For the sake of clarity, the method is discussed in terms of an exemplary system 100, as shown in FIG. 1, configured to practice the method. The steps outlined herein are exemplary and can be implemented in any combination thereof, including combinations that exclude, add, or modify certain steps.

FIG. 3 illustrates an example method embodiment. The system 100 can display, via a user interface, graphical elements according to a common attribute (302). Each graphical element can represent an open communication line connecting a first device associated with a first user with a second respective device associated with a second respective user. The first device and the second device can be a specific device, such as a mobile phone, and/or part of a device, such as a specific input and/or output capability of a device. The first and second devices can also include an external device. For example, the first device can include an external device, such as a microphone or a camera, attached to the first device. External devices can also be bridged with the first device and/or the second device. For example, the first device can be expanded to include a device in a room, such as a speaker or a screen.

The system 100 can receive a selection of a graphical element from the first user, indicating a selected device associated with a respective user (304). Based on the selection, the system 100 can manipulate a corresponding open communication line connecting the first device with the selected device (306). The first user can hear and/or speak exclusively to the respective user via the corresponding open communication line. For example, the system 100 can connect a device associated with a stock trader with a device associated with a buyer using an open communication line. Here, the stock trader and the buyer can hear and/or speak exclusively to each other via the open communication line. The first user can also see and/or transmit information and files to the respective user via the corresponding open communication line. The first user can also receive information, such as video, audio, data, files, etc., from the respective user, via the corresponding open communication line. Moreover, the first user can also see, via the corresponding open communication line, a presence of the respective user, a status of the respective user and/or the corresponding open communication line, and/or activity in the corresponding open communication line. The activity can be a recording, a conversation, a state, a change in state, a request, a command, an alert, an animation, a movement, an action, etc.

The open communication line can be a dedicated, always-on communication line that only needs activation. The open communication line can enable communication between users, including voice/audio communication, video communication, media communication, chat, messaging, text, email, file transfer, etc. The system 100 can manipulate the open communication line by activating or deactivating the open communication line. Activating the open communication line can include initiating a communication via the open communication line, initiating a recording of a communication in the open communication line, monitoring a communication in the open communication line, transmitting a message via the communication line, mixing audio in the open communication line, etc. The open communication line can be activated, for example, by clicking, via a mouse or another input device, a name or photo of a user in a graphical user interface. The open communication line can also be manipulated by using a microphone to speak a name, nickname, company, or identifier associated with a user, for example. For example, speech input can be used to control one or more graphical elements. The system 100 can also accept input from a touch screen. For example, a user can use a touch screen to scroll through a list of contacts and select a user to initiate a communication with that user. Additionally, a first user can drag and drop a selected user into a "call" space, where the user is automatically connected with the selected user. Any mode of selecting a user is contemplated.

Audio provided through the open communication line can be provided by audio spatialization. Audio spatialization can allow a user to hear audio as if the audio is coming from any point in space, rather than just from two speakers. One example of audio spatialization is surround sound, which allows the listeners to hear audio coming from many points in the room, rather than two speakers. For example, consider a stock trader connected to both a buyer and a seller via separate communication lines. Using a traditional turret phone having two handsets, the stock trader would hear and speak to the buyer using one handset and the seller using the other handset. The trader could hear the buyer on the left and could hear the seller on the right. Using audio spatialization, the trader could still communicate in the same manner through the system 100, without the use of separate handsets. Audio spatialization can allow a user an enhanced listening experience because the user can hear the direction a sound originated from, making the experience more realistic.

The system 100 can update graphical elements, via a user interface, representing open communication lines based on activity associated with the open communication line, a status associated with the open communication line, an input from a user, a state associated with the open communication line, a presence of a user/device, a change in state of a communication line, a recording, a signal, an analysis, a media event, a communication, a sound, a visual event, a parameter, a schedule, etc. For example, the system 100 can represent open communication lines with a particular color, such as green, or text on the display such as "open," and can change the color or text displayed for the particular communication line when the system 100 detects a change in state of the communication line. The system 100 can represent busy communication lines with a particular color, such as red or text on the display such as "busy". The system 100 can use animated graphics to indicate available or unavailable communication lines. The system 100 can represent other elements in the user interface, such as users or companies associated with the communication lines, with photos, text, icons, etc. When an activity or status associated with the open communication line changes, the system 100 can update one or more graphical elements to reflect the change. For example, when a particular open communication line changes from available to busy, a color, text or icon can change indicating the line is unavailable. In another example, when a user associated with the open communication line changes, the system 100 can update the graphical element representing the user, such as a photo or user profile.

The system 100 can monitor activity in one or more communication lines. For example, the system 100 can monitor one or more communication lines to identify a conversation related to a particular stock. Then, when the system 100 identifies a conversation related to a particular stock, the system 100 can provide an alert, a message, an announcement, a report, a chart, a request, etc. Further, when the system 100 identifies a conversation related to a particular stock, it can similarly update one or more graphical elements in the display to illustrate the fact that a conversation is related to a particular stock. The system 100 can search for keywords and/or topics from audio, video, and/or text in a communication line in order to identify instances of the keywords and/or topics in one or more communication lines. The system 100 can also monitor a conversation, for example, in a communication line for a particular keyword to identify instance of the keyword in the conversation. The system 100 can then alert the user that the keyword was mentioned/included in the particular conversation and/or initiate a particular action with respect to the particular conversation. For example, the system 100 can begin to record the conversation for future playback, the system 100 can continue to monitor the conversation, the system 100 can analyze the conversation, the system 100 can request input from the user, the system 100 can terminate the conversation, etc. The system 100 can place a graphical object, such as a "bug," in a location in a virtual environment represented by the set of graphical elements, in order to hear, record, and/or analyze information from a communication line. The graphical object can also be configured to hear, record, and/or analyze elements associated with other graphical objects in the virtual environment that are within a range of the graphical object. The range can be based on a user preference, a parameter, a setting, a time, a communication line, etc. The range can also be controlled by a user and/or device. Different graphical objects, or "bugs," can have different properties, including monitoring properties, recording properties, interruption properties, alerting properties, activity properties, functional properties, user properties, etc. The type of information monitored can be based on filters, which can be specified by a user and/or device, for example. Further, the information monitored can also be based on an analysis of video feeds, text feeds, audio, files, comments, etc. The type of information can include state information, changes in state, changes in volume, specific utterances, specific messages, specific topics, presence information, file characteristics, user identities, etc. The system 100 can also provide alerts based on analyzed and/or monitored information. Alerts can be provided via separate channels. For example, some alerts can be provided graphically as images or graphical elements, and other alerts can be provided through audio, such as whisper notifications. In some aspects, audio alerts can be spatialized. For example, audio alerts can be spatialized by a user's ear.

The graphical elements can depict a virtual environment in a graphical user interface. Moreover, graphical elements within the virtual environment can depict specific turret features. For example, graphical elements can depict a hoot and holer, squawk, and/or intercom features. The graphical elements in the virtual environment can be used to control coverage. The graphical elements in the virtual environment can also be used to control and/or monitor external systems, such as a trading order system, an email system, a telephone system, etc. The virtual environment can provide a graphical representation of history of usage and/or activity available for playback. For example, the virtual environment can provide an animation of recorded activities. The virtual environment can also include an arrangement of a directory of communication lines, users, devices, entities, objects, places, organizations, etc. The graphical display of the virtual environment can also be augmented with graphical elements on an auxiliary device and/or with overlay planes, including, for example, smart glasses, a mobile phone, a camera, a display system, an augmented reality system, etc. For example, a user can look at a graphical element on the display, such as a virtual room, and overlay graphics can display the monitored information for the user. The graphical environment can be displayed on a large, medium, and/or small display. For example, the graphical environment can be displayed on a very large display on the wall.

Furthermore, several configurations and/or representations of the entirety of the virtual environment can also be provided simultaneously. Similarly, several configurations and/or representations of the user's physical environment can also be provided. The user's physical environment can include, for example, the user's location, the user's set of input/output devices, external devices, any mappings of devices and/or communication lines, the user's network, etc. Moreover, the user can navigate the virtual environment via the graphical user interface and/or any input device. For example, the user can teleport herself to places in the virtual environment based on monitored and/or specific information and/or activities. The system 100 can manipulate the virtual environment based on a setting, a configuration, a request, an input, a parameter, a context, etc. Further, the system 100 can assign positions for one or more elements in the virtual environment automatically based on a dynamic layout algorithm(s). The layout of the virtual environment can also be based on a user-specific configuration, for example. The system 100 can establish rules for a configuration of a virtual environment. For example, the system 100 can specify that high volume groupings (e.g., virtual rooms) be moved to the top of the virtual environment.

Figure 4:
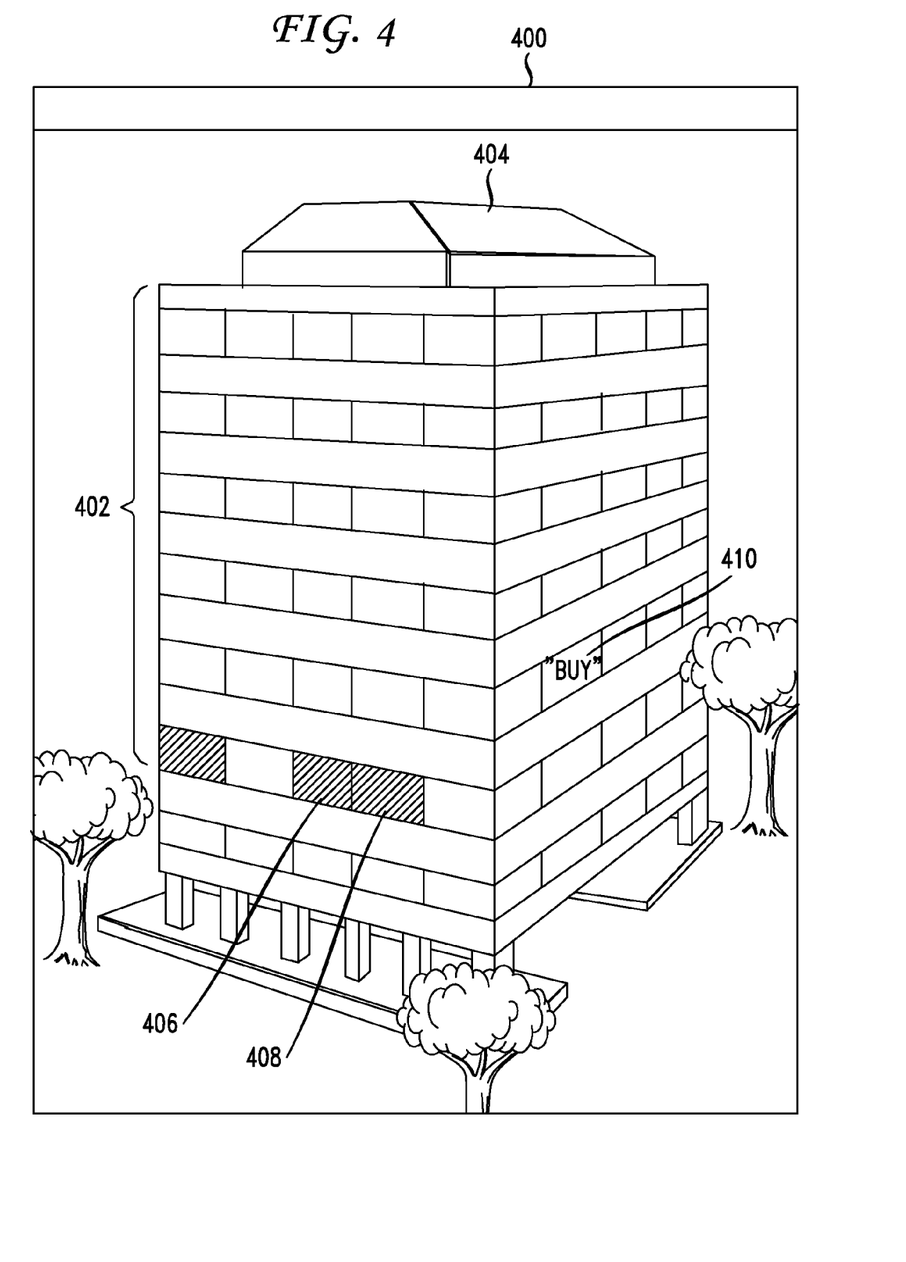
FIG. 4 illustrates an example virtual building for a soft-turret user interface.

In one embodiment, the system 100 can group graphical elements in a user interface to create a virtual environment represented by one or more virtual buildings including specialized rooms. The graphical elements can include a two-dimensional or three-dimensional environment representing a collection of active and available communication lines and callees. FIG. 4 illustrates an example virtual building system embodiment 400 having multiple floors of rooms. Each of the specialized rooms 402 in the virtual building 404 can graphically represent one or more of an activity status, a buyer, a seller, a communication line and a device in use. For example, rooms 406 and 408 can have shaded windows, which can represent unavailable rooms, or unavailable communication lines. The system 100 can group specialized rooms together on floors or in particular areas of the building based on commonalities such that the user does not need to remember groups. For example, all the lines related to a specific company or market sector can be grouped together, in a section of the building, such as rooms on a floor or in columns. Utilizing a virtual environment can allow a user to have a complete view of all of the connections, and grouping calls can allow the user to efficiently find a particular call instead of memorizing which page the call is located on in a traditional turret phone system.

The system 100 can display photos and/or profiles associated with callees in a specialized room, such that a user can view all of the specialized rooms and callees in each room at once. Allowing a user to view all specialized rooms, or communication lines, the activity level of each communication line and which callees are communicating can provide valuable information. For example, a stock trader can use the interface to connect with multiple buyers and sellers at once, each room having a buyer and a seller. The stock trader can set-up multiple rooms with buyers and sellers and can complete multiple simultaneous transactions. The system can connect the stock trader to each buyer and seller independently, such that buyers and sellers do not communicate with each other directly, but that the stock trader communicates with both parties exclusively and efficiently. The stock trader can easily switch between conversing with a buyer and a seller in a room by selecting the room and selecting one side of the display representing a buyer, for example. In one example, a stock trader can conduct a voice call with a buyer in a room, and at the same time the stock trader can instant message a seller, negotiating a transaction via two different modes of communication, a voice call and instant messaging. Alternately, the stock trader can conduct voice calls with each of the buyer and seller to negotiate a transaction.

In addition to viewing the virtual environment, a user associated with the user interface can select a set of communication lines such that the user can be heard by participants connected to the set of communication lines and the participants connected to the set of communication lines can be heard by the user. This functionality can be referred to as "hoot n' holler." Moreover, this type of connection can enable the user to make announcements via the communication lines, such as announcing a new price offered by stock sellers, or allow participants to make bids on a transaction.

Another function offered by the user interface can allow a user to select open communication lines, and based on the selection, the system 100 can monitor the open communication lines. Monitoring open communication lines can include playing the audio from the lines such that the user can hear audio from multiple lines at once. In addition to playing audio from monitored communication lines, the system 100 can analyze audio from the open communication line for one or more of an activity level, specific words, speaker tone and speech recognition to yield an audio analysis. For example, a user can select multiple active rooms in a virtual building such that the user can listen to the conversations in each room. A user can listen for key words spoken in the selected rooms, such as "buy", "sell" or "pork bellies," and can act according to the words heard. If the user is interested in "pork bellies", the user can attempt to jump in to the transaction occurring on the communication line associated with "pork bellies." In another example, the user can listen for word pairs, such as "buy" and "smartphone," on the same communication line. The user can listen for speaker tone, such as agitated or calm, or can use speech recognition to identify the speaker of a monitored communication line. The user can attempt to intercept a transaction perceived as negative, when the system 100 identifies one or more speakers using speech recognition on the same communication line. In one example, a traditional tag cloud that displays word frequency through font size can show the most frequently used terms in a room or a set of rooms. In another implementation, color coding can indicate falling or rising prices. Any manner of analyzing audio associated with one or more monitored communication lines is contemplated.

After the system 100 analyzes audio from one or more communication lines, the system 100 can update graphical elements in the virtual building based on an audio analysis. Updating the graphical elements can include overlaying text on a graphic for example, such as overlaying the word "buy" 410 on a graphic of a specialized room in the virtual building after hearing the word through a monitored communication line. In another example, the system 100 can display each word spoken from each monitored communication line in association with the room in the virtual building from which the word was spoken, such that the user can read the words as well as listen to the audio from monitored communication lines. When a speaker in a particular room changes volume, the color of the room can increase or decrease in intensity, depending on whether the volume increases or decreases. When the system 100 identifies a speaker on a monitored communication line, the system 100 can include a photo of the speaker in the room from which the speaker was heard.

Figure 5:
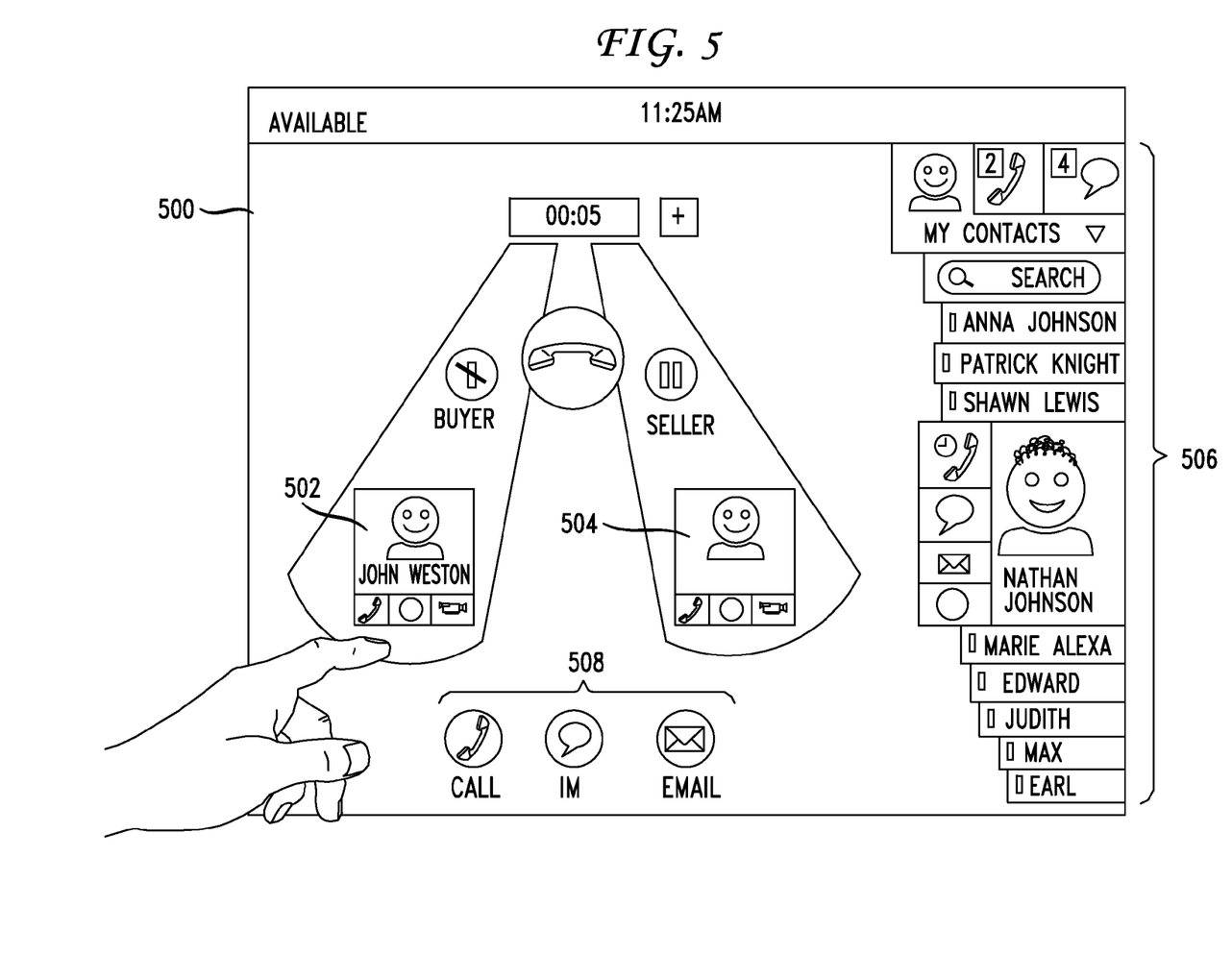
FIG. 5 illustrates an example virtual room for a soft-turret user interface.

In addition to displaying an entire collection of communication lines using a virtual building, the system 100 can display information associated with a particular room based on a user selection of the room in the building. FIG. 5 illustrates an example virtual room system embodiment. Upon selection of a room in the building, by clicking on a room using a mouse or selecting a room using a touch screen for example, the system 100 can display detailed information associated with the connection represented by the room 500. For example, the system 100 can display information such as which users are currently connected 502, 504 and their role such as buyer or seller. The system 100 can display additional information such as one or more contact lists 506, such that the user can search contacts, create lists based on company affiliation, input profile information related to contacts and select contacts to connect with. The user can search contacts using a "hand swipe" across a touch screen to scroll, for example. Additionally, the system 100 can display different modes of communication available 508, such as a voice call, instant messaging, email, etc. The system 100 can display one or more statuses related to one or more users such as muted, or which user is currently speaking Other information such as length of call and information related to a profile associated with a user can be displayed. Any information associated with a virtual room is contemplated. Enabling a user to view detailed information about current calls and callees can greatly enhance the user experience compared to using a traditional turret phone which displays minimal information about calls and callees.

Other virtual environments representing a collection of active and available communication lines and callees are contemplated. Any virtual environment that graphically displays elements representing communication lines is possible that provides a collective overview and a detailed description, such as a virtual map. In additional to applying the concepts disclosed herein to a turret phone system, the concepts can be applied to a conferencing or help desk scenario, for example, that are always available for user technical support.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to any graphical representation of open communication lines. Those skilled in the art will readily recognize various modifications and changes that may be made to the principles described herein without following the example embodiments and applications illustrated and described herein, and without departing from the spirit and scope of the disclosure.

We claim:

1. A method comprising:
at a first device having a plurality of open communication lines, displaying, via a graphical user interface, graphical elements grouped according to a common attribute, each of the graphical elements representing a respective open communication line of the plurality of open communication lines, wherein the respective open communication line is an always-on communication line dedicated to a respective connection between the first device associated with a first user and a respective second device associated with a respective second user;
receiving a selection of a graphical element of the graphical elements from the first user indicating a selected device;
based on the selection, manipulating a corresponding open communication line connecting the first device with the selected device.

2. The method of claim 1, wherein the first user can perform at least one from among hearing exclusively from the selected device via the corresponding open communication line and speaking exclusively to the selected device via the corresponding open communication line.

3. The method of claim 1, wherein manipulating the corresponding open communication line comprises one from among activating the corresponding open communication line or deactivating the corresponding open communication line.

4. The method of claim 3, wherein activating the corresponding open communication line comprises initiating a communication via the corresponding open communication line, wherein audio in the communication is provided via audio spatialization.

5. The method of claim 3, wherein activating the corresponding open communication line comprises mixing audio associated with a communication via the corresponding open communication line.

6. The method of claim 1, further comprising updating the graphical elements based on at least one from among an activity associated with the corresponding open communication line and a status associated with the corresponding open communication line.

7. The method of claim 6, wherein the activity associated with the corresponding open communication line comprises at least one from among a state of activity, a change in the state of activity, an analysis, a recording, a signal, a media event, a communication, a sound, and a visual event.

8. The method of claim 1, wherein the graphical elements are grouped together in a virtual environment.

9. The method of claim 6, wherein the virtual environment comprises specialized rooms, and wherein each of the specialized rooms graphically represents at least one from among an activity status, a buyer, a seller, a communication line, and a device in use.

10. The method of claim 1, wherein the first user selects a set of communication lines such that the first user is heard by participants connected to the set of communication lines and the participants connected to the set of communication lines are heard by the first user.

11. The method of claim 1, further comprises monitoring the corresponding open communication line based on the selection, wherein monitoring the corresponding open communication line comprises at least one from among playing audio from the corresponding open communication line, detecting activity in the corresponding open communication line, interpreting activity in the corresponding open communication line, analyzing activity in the corresponding open communication line, analyzing a state associated with the corresponding open communication line, and analyzing presence information associated with the corresponding open communication line.

12. The method of claim 11, wherein monitoring the corresponding open communication line further comprises analyzing the audio from the corresponding open communication line for at least one from among an activity level, a state, a presence, an interpreted activity, an analyzed activity, specific words, speaker tone, and speech recognition, to yield an audio analysis.

13. The method of claim 12, further comprising updating the graphical elements based on the audio analysis.

14. The method of claim 1, wherein the corresponding open communication line is manipulated through at least one from among user gestures, a user selection, user input, and a drag and drop feature.

15. The method of claim 1, wherein the graphical elements comprise a three-dimensional environment representing a collection of active and available communication lines and callees.

16. A system comprising:
  a processor; and
  a computer-readable storage medium having instructions stored which, when executed by the processor, cause the processor to perform operations comprising:
    at a first device having a plurality of open communication lines, displaying, via a graphical user interface, graphical elements grouped according to a common attribute, each of the graphical elements representing a respective open communication line of the plurality of open communication lines, wherein the respective open communication line is an always-on communication line dedicated to a respective connection between the first device associated with a first user and a respective second device associated with a respective second user;
    receiving a selection of a graphical element of the graphical elements from the first user, the selection indicating a selected user associated with a respective device;
    based on the selection, manipulating a corresponding open communication line connecting the first device associated with the first user with the respective device associated with the selected user.

17. The system of claim 16, wherein the first user can perform at least one from among hearing exclusively from the selected user via the corresponding open communication line and speaking exclusively to the selected user via the corresponding open communication line.

18. The system of claim 16, wherein manipulating the corresponding open communication line comprises at least one from among activating the corresponding open communication line and deactivating the corresponding open communication line.

19. The system of claim 18, wherein activating the corresponding open communication line comprises initiating a communication via the corresponding open communication line, wherein audio in the communication is provided via audio spatialization.

20. A computer-readable storage medium having instructions stored which, when executed by a processor, cause the processor to perform operations comprising:
  at a first device having a plurality of open communication lines, displaying, via a graphical user interface, graphical elements grouped according to a common attribute, each of the graphical elements representing a respective open communication line of the plurality of open communication lines, wherein the respective open communication line is an always-on communication line dedicated to a respective connection between the first device associated with a first user and a respective second device associated with a respective second user;
  receiving a selection of a graphical element of the graphical elements from the first user, the selection indicating a selected device;
  based on the selection, manipulating a corresponding open communication line connecting the first device with the selected device.

21. The computer-readable storage medium of claim 20, storing additional instructions which, when executed by the processor, result in the operations further comprising monitoring the corresponding open communication line based on the selection, wherein monitoring the corresponding open communication line comprises playing audio from the open communication line.

22. The computer-readable storage medium of claim 20, storing additional instructions which, when executed by the processor, result in the operations further comprising analyzing the audio from the corresponding open communication line for at least one of an activity level, specific words, speaker tone, or speech recognition, to yield an audio analysis.

* * * * *